US006732032B1

(12) United States Patent
Banet et al.

(10) Patent No.: US 6,732,032 B1
(45) Date of Patent: *May 4, 2004

(54) WIRELESS DIAGNOSTIC SYSTEM FOR CHARACTERIZING A VEHICLE'S EXHAUST EMISSIONS

(75) Inventors: Matthew J. Banet, Del Mar, CA (US); Bruce Lightner, La Jolla, CA (US); Diego Borrego, El Paso, TX (US); Chuck Myers, La Jolla, CA (US); Larkin Hill Lowrey, La Jolla, CA (US)

(73) Assignee: Reynolds and Reynolds Holdings, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/456,788

(22) Filed: Jun. 6, 2003

Related U.S. Application Data

(63) Continuation of application No. 09/776,033, filed on Feb. 1, 2001, now Pat. No. 6,604,033.
(60) Provisional application No. 60/222,152, filed on Aug. 1, 2000, provisional application No. 60/222,213, filed on Aug. 1, 2000, and provisional application No. 60/220,986, filed on Jul. 25, 2000.

(51) Int. Cl.[7] .............................................. G01M 15/00
(52) U.S. Cl. ........................................... 701/33; 701/29
(58) Field of Search ..................... 701/29, 33; 73/117.2

(56) References Cited

U.S. PATENT DOCUMENTS

| | | |
|---|---|---|
| 3,748,894 A | 7/1973 | White et al. |
| 4,258,421 A | 3/1981 | Juhasz et al. |
| 4,602,127 A | 7/1986 | Neely et al. |
| 4,926,330 A | 5/1990 | Abe et al. |
| 4,956,777 A | 9/1990 | Cearley et al. |
| 5,050,080 A | 9/1991 | Abe |
| 5,157,610 A | 10/1992 | Asano et al. |
| 5,289,378 A | 2/1994 | Miller et al. |
| 5,343,906 A * | 9/1994 | Tibbals, III .................. 141/83 |
| 5,442,553 A | 8/1995 | Parrillo |
| 5,450,321 A | 9/1995 | Crane |
| 5,463,567 A | 10/1995 | Boen et al. |
| 5,473,540 A | 12/1995 | Schmitz |
| 5,479,479 A | 12/1995 | Braitberg et al. |

(List continued on next page.)

FOREIGN PATENT DOCUMENTS

| | | |
|---|---|---|
| EP | 0816820 A2 * | 1/1998 |
| WO | WO 00/79727 | 12/2000 |

OTHER PUBLICATIONS

RD–422061 A; Anonymous; Jun. 10, 1999; Abstract; Using Internet for vehicle diagnostics–enabling using to operate vehicle personal computer to direct web browser to vehicle diagnostics website . . . .*

(List continued on next page.)

*Primary Examiner*—Michael J. Zanelli
(74) *Attorney, Agent, or Firm*—Stephen C. Glazier; Kirkpatrick & Lockhart LLP

(57) ABSTRACT

The invention features a method and apparatus for remotely characterizing a vehicle's emissions performance. The method features the steps of: i) generating data representative of the vehicle's emissions performance with at least one microcontroller disposed within the vehicle; ii) transferring the data through an OBD, OBD-II or equivalent electrical connector to a data collector/router that includes a microprocessor and an electrically connected wireless transmitter; iii) transmitting a data packet representing the data with the wireless transmitter over an airlink to a wireless communications system and then to a host computer; and iv) analyzing the data packet with the host computer to characterize the vehicle's emissions performance.

89 Claims, 8 Drawing Sheets

U.S. PATENT DOCUMENTS

| | | | |
|---|---|---|---|
| 5,537,336 | A | 7/1996 | Joyce |
| 5,574,427 | A | 11/1996 | Cavallaro |
| 5,680,328 | A | 10/1997 | Skorupski et al. |
| 5,732,074 | A | 3/1998 | Spaur et al. |
| 5,737,215 | A | 4/1998 | Schricker et al. |
| 5,754,965 | A | 5/1998 | Hagenbuch |
| 5,758,300 | A | 5/1998 | Abe |
| 5,797,134 | A | 8/1998 | McMillan et al. |
| 5,808,907 | A | 9/1998 | Shetty et al. |
| 5,850,209 | A | 12/1998 | Lemke et al. |
| 5,884,202 | A | 3/1999 | Arjomand |
| 5,928,292 | A | 7/1999 | Miller et al. |
| 5,941,918 | A * | 8/1999 | Blosser ............... 340/439 |
| 6,064,970 | A | 5/2000 | McMillan et al. |
| 6,104,988 | A | 8/2000 | Klarer |
| 6,141,611 | A | 10/2000 | Mackey et al. |
| 6,167,426 | A | 12/2000 | Payne et al. |
| 6,263,268 | B1 * | 7/2001 | Nathanson ............ 340/870.01 |
| 6,295,492 | B1 | 9/2001 | Lang et al. |
| 6,338,152 | B1 | 1/2002 | Fera et al. |
| 6,356,205 | B1 | 3/2002 | Salvo et al. |
| 6,459,988 | B1 | 10/2002 | Fan et al. |
| 6,505,106 | B1 * | 1/2003 | Lawrence et al. ............ 701/35 |
| 6,529,159 | B1 | 3/2003 | Fan et al. |
| 6,552,682 | B1 | 4/2003 | Fan et al. |
| 6,594,579 | B1 | 7/2003 | Lowrey et al. |
| 6,604,033 | B1 | 8/2003 | Banet et al. |
| 6,611,740 | B2 | 8/2003 | Lowrey et al. |

OTHER PUBLICATIONS

Bary W. Wilson et al., Modular system for multiparameter in–line machine fluid analysis (Technology showcase Apr. 3–6, 2000).

U.S. patent application Ser. No. 09/776,083, Banet et al., filed Feb. 1, 2001.

U.S. patent application Ser. No. 09/776,106, Lightner et al., filed Feb. 1, 2001.

U.S. patent application Ser. No. 09/804,888, Lowrey et al., filed Mar. 13, 2001.

U.S. patent application Ser. No. 09/908,440, Lightner et al., filed Jul. 18, 2001.

U.S. patent application Ser. No. 10/301,010, Lightner et al., filed Nov. 21, 2002.

U.S. patent application Ser. No. 10/431,947, Hunt et al., filed May 8, 2003.

U.S. patent application Ser. No. 10/447,713, Lightner et al., filed May 29, 2003.

U.S. patent application Ser. No. 10/456,246, Lowrey et al., filed Jun. 6, 2003.

U.S. patent application Ser. No. 10/614,665, Lowrey et al., filed Jul. 7, 2003.

U.S. patent application Ser. No. 10/615,516, Lightner et al., filed Jul. 8, 2003.

U.S. patent application Ser. No. 10/625,942, Banet et al., filed Jul. 24, 2003.

U.S. patent application Ser. No. 10/626,779, Lightner et al., filed Jul. 24, 2003.

U.S. patent application Ser. No. 10/626,810, Lowrey et al., filed Jul. 24, 2003.

U.S. patent application Ser. No. 10/632,033, Banet et al., filed Jul. 31, 2003.

* cited by examiner

| | | | |
|---|---|---|---|
| Freeze frame trouble code: | 35830 | | (PID 01/02) |
| Fuel system status: | 512 | | (PID 01/03) |
| Calculated load value: | 30 | | (PID 01/04) |
| Engine coolant temp: | 199 | degF | (PID 01/05) |
| Short term fuel trim bank 1: | 128 | | (PID 01/06) |
| Fuel pressure gauge : | 936 | | (PID 01/0a) |
| Intake manifold pressure: | 54 | KPa | (PID 01/0b) |
| Engine speed: | 1562 | RPM | (PID 01/0c) |
| Vehicle speed: | 0 | MPH | (PID 01/0d) |
| Ignition timing (ATDC): | 19 | deg | (PID 01/0e) |
| Intake air temp: | 100 | degF | (PID 01/0f) |
| Air flow rate: | 6400 | | (PID 01/10) |
| Commanded sec. air status: | 68 | | (PID 01/12) |
| O2 sensor location: | 3 | | (PID 01/13) |
| O2 data bank 1 sensor 1: | 6400 | | (PID 01/14) |
| O2 data bank 2 sensor 4: | 0 | | (PID 01/1b) |

Fig. 2

WIRELESS DIAGNOSTIC SYSTEM FOR CHARACTERIZING A VEHICLE'S EXHAUST EMISSIONS

RELATED APPLICATIONS

This application is a continuation application of U.S. patent application Ser. No. 09/776,033, filed Feb. 1, 2001, now U.S. Pat. No. 6,604,033, the contents of which are incorporated herein by reference, which claims the benefit of U.S. provisional patent applications Ser. Nos. 60/222,152, filed Aug. 1, 2000, 60/222,213, filed Aug. 1, 2000, and 60/220,986, filed Jul. 25, 2000, the contents of which are incorporated herein by reference.

In addition, this application is related to the following U.S. Patent Applications that were filed on the same day as the present application: (1) U.S. patent application Ser. No. 09/776,106 entitled "Wireless Diagnostic System for Vehicles" with inventors Bruce Lightner, Diego Borrego, Chuck Myers, and Larkin H. Lowrey and (2) U.S. patent application Ser. No. 09/776,083 entitled "Wireless Diagnostic System for Characterizing One or More Vehicles' Mileage, Fuel Level, and Period of Operation" with inventors Matthew J. Banet, Bruce Lightner, Diego Borrego, Chuck Myers, and Larkin H. Lowrey both of which are hereby incorporated by reference.

FIELD OF THE INVENTION

The present invention relates generally to the use of wireless communications and diagnostic systems in automotive vehicles.

BACKGROUND OF THE INVENTION

The Environmental Protection Agency (EPA) requires vehicle manufacturers to install on-board diagnostics (OBD) for emission control on their light-duty automobiles and trucks beginning with model year 1996. OBD systems (e.g., computer, microcontrollers, and sensors) monitor the vehicle's emission control systems to detect any malfunction or deterioration that causes emissions to exceed EPA-mandated thresholds. Such a system, for example, is an oxygen or nitrogen-sensitive sensor located in the vehicle's exhaust manifold and tailpipe.

The EPA requires that all information monitored or calculated by OBD systems is made available through a standardized, serial 16-cavity connector referred to as the ALDL (Assembly Line Diagnostic Link) or OBD connector. All physical and electrical characteristics of this connector are standard for all vehicles sold in the United States after 1996. The EPA also mandates that, when emission thresholds are exceeded, diagnostic information characterized by OBD systems must be stored in the vehicle's central computer so that it can be used during diagnosis and repair.

A second generation of OBD systems, called OBD-II systems, monitor emission performance and a wide range of additional data that indicate the performance of the host vehicle. For example, in addition to emissions, OBD-II systems monitor vehicle speed, mileage, engine temperature, and intake manifold pressure. OBD-II systems also query manufacturer-specific data, such as engine-performance tuning parameters, alarm status, and properties relating to entertainment systems. In total, OBD-II systems typically access hundreds of segments of data relating to the performance and make of the host vehicle.

In addition to the OBD-II systems, most vehicles manufactured after 1996 have electronic control units (ECUs) that control internal electromechanical actuators. Examples include ECUs that control fuel-injector pulses, spark-plug timing, and anti-lock braking systems. Most ECUs transmit status and diagnostic information over a shared, standardized electronic buss in the vehicle. The buss effectively functions as an on-board computer network with many processors, each of which transmits and receives data. The primary computers in this network are the vehicle's electronic-control module (ECM) and power-control module (PCM). The ECM typically accesses sensors and microcontrollers that monitor or control engine functions (e.g., the cruise-control module, spark controller, exhaust/gas recirculator). The PCM typically controls or monitors ECUs associated with the vehicle's power train (e.g., its engine, transmission, and braking systems).

When a vehicle is serviced (e.g., for an emissions or 'smog check'), data from the standardized buss can be queried using external engine-diagnostic equipment (commonly called 'scan tools') that connect to the above-described 16-cavity electrical connector (called an 'OBD-II connector' for vehicles made after 1996). The OBD-II connector is typically located under the vehicle's dashboard. Data transferred through the connector to the scan tool includes data like that described above as well as 'diagnostic trouble codes' or 'DTCs' that identify a specific malfunctioning component of the vehicle. This makes the service process more efficient and cost-effective.

Some manufacturers include complex electronic systems in their vehicles to access and analyze the above-described data. These systems are not connected through the OBD-II connector, but instead are wired directly to the vehicle's electronic system. This wiring process typically takes place when the vehicle is manufactured. In some cases these systems transmit data through a wireless network.

BRIEF SUMMARY OF THE INVENTION

It is an object of the present invention to address the limitations of the conventional engine-diagnostic systems discussed above. Specifically, it is an object of the invention to both access and send data relating to emissions over a vehicle's ODB-II connector using a remote, wireless system that connects to the Internet. The data are then analyzed and used to monitor the vehicle's emissions output. This allows, for example, a remote, on-line emissions check for the vehicle that is done completely over the Internet.

In one aspect, the invention features a method and apparatus for remotely characterizing a vehicle's exhaust emissions. The method features the steps of: 1) generating data representative of the vehicle's emissions with at least one sensor disposed within the vehicle; 2) transferring the data through to a data collector/router that includes: i) a microprocessor; and ii) a wireless transmitter in electrical contact with the microprocessor; and 3) transmitting a data packet representing the data with the wireless transmitter over an airlink to a wireless communications system and then to a host computer.

"Data representative of the vehicle's emissions", as used herein, means data that can be analyzed or processed to infer, estimate, or predict the emissions of a particular vehicle. "Emissions" means gaseous forms of the following compounds: hydrocarbons, oxides of nitrogen, carbon monoxide, or derivatives thereof.

In some embodiments the data can be transferred directly from the ECM/PCM to the data collector/router (i.e., the data collector/router is embedded in the vehicle). Alternatively the data is serially transferred through an OBD-II connector or an equivalent serial interface located within the vehicle to the data collector/router. In this case, "equivalent serial interface" means any interface or connector that allows data to be queried from the vehicle's ECM. In this case, the data collector/router is typically located underneath the vehicle's dash. In both cases, the generating step includes generating emissions data using one or more sensors (typically located in the vehicle's exhaust manifold or tailpipe) that produce a signal in response to gas containing oxygen, oxides of nitrogen, or hydrocarbons.

The method also features the step of analyzing the data packet with the host computer to characterize the vehicle's emissions performance. In this case, the analyzing step features the step of extracting data from the data packet corresponding to the vehicle's emissions and storing the data in a computer memory or database. Once in the database, the data can be processed with an algorithm, such as a mathematical algorithm that predicts or estimates the emissions (e.g., an estimate of the concentration or amount of oxygen, oxides of nitrogen, or hydrocarbons) from the vehicle.

The analyzing step can also include the step of comparing the data with data collected at an earlier time to characterize the emissions performance of the vehicle. For example, the data can be compared to a predetermined numerical value or collection of values that represent 'acceptable' exhaust emissions. After the comparison, the method can further include sending an electronic text, data, or voice message to a computer, cellular telephone, or wireless device. The message describes a status of the vehicle's emissions. In a related embodiment, the vehicle's emissions status is displayed directly on a page on the Internet or World-wide web.

In still another embodiment, the method includes the step of sending a second data packet from the host computer system over an airlink to the wireless communications system and then to the data collector/router disposed in the vehicle. In this case, the second data packet is processed by the microprocessor in the data collector/router to generate a signal, and the signal is sent to at least one microcontroller disposed within the vehicle. The signal, for example, can be processed by the microcontroller and used to adjust one or more of its properties. For example, the signal can be used to 'clear a DTC' (i.e., change the DTC's state from active to inactive) in the vehicle's ECM.

In the above-described method, the terms 'microcontroller' and 'microprocessor' refer to standard electronic devices (e.g., programmable, silicon-based devices) that can control and/or process data. "Airlink" refers to a standard wireless connection (e.g., a connection used for wireless telephones or pagers) between a transmitter and a receiver.

Also in the above-described method, steps i)–iv) can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses (e.g., a conventional emissions check) may require the steps to be performed only once each year or after a large number of miles are driven. Similarly, steps i)–iii) (i.e. the 'generating', 'transferring', and 'transmitting' steps) may be performed in response to a signal sent from the host computer to the vehicle. Alternatively, the vehicle may be configured to automatically perform these steps at predetermined or random time intervals. In another embodiment, a vehicle's emissions can be continually monitored, and the vehicle's owner is only notified when the vehicle 'fails' the emissions test. In any embodiment described herein involving 'passing' or 'failing' an emissions test, the definition of 'pass' or 'fail' is determined by the appropriate regulating body, e.g. California Air Resources Board ('CARB') or an equivalent state-wide organization, the Environmental Protection Agency ('EPA'), or a similar organization.

The invention has many advantages. In particular, wireless transmission of a vehicle's emissions data makes it possible to remotely identify potential problems and perform 'on-line emissions checks' without bringing the vehicle to a conventional service center. In certain situations, this means potential problems with a vehicle's emissions system can be rapidly determined, or in some cases remotely predicted and addressed before they actually occur. Moreover, emissions data from the vehicle can be queried and analyzed frequently and in real-time (i.e., while the vehicle is actually in use) to provide a relatively comprehensive diagnosis that is not possible in a conventional service center.

The device used to access and transmit the vehicle's data is small, low-cost, and can be easily installed in nearly every vehicle with an OBD-II connector in a matter of minutes. It can also be easily transferred from one vehicle to another, or easily replaced if it malfunctions.

Communication with the vehicle's OBD buss can also be bi-directional, making it possible to actually remotely address problems with the vehicle's emissions system. For example, DTCs related to the vehicle's emissions system can be cleared remotely.

Another advantage of the invention is that emissions data transmitted from a particular vehicle over a wireless airlink can be accessed and analyzed through the Internet without the need for expensive diagnostic equipment. Software used for the analysis can be easily modified and updated, and then used by anyone with access to the Internet. This obviates the need for vehicle service centers to upgrade diagnostic equipment for next-generation vehicles. The resulting data, of course, have many uses for vehicle owners, surveyors of vehicle emission performance (e.g., the EPA or J.D. Power), manufacturers of vehicles and related parts, and vehicle service centers.

Sophisticated analysis of the above-mentioned data yields information that benefits the consumer, vehicle and parts manufacturers, vehicle service centers, and the environment.

These and other advantages of the invention are described in the following detailed disclosure and in the claims.

BRIEF DESCRIPTION OF DRAWINGS

The features and advantages of the present invention can be understood by reference to the following detailed description taken with the drawings, in which:

FIG. 2 is a screen capture of an emissions data file generated using the wireless diagnostic system of FIG. 1;

DESCRIPTION OF THE PREFERRED EMBODIMENTS

Figure 1:
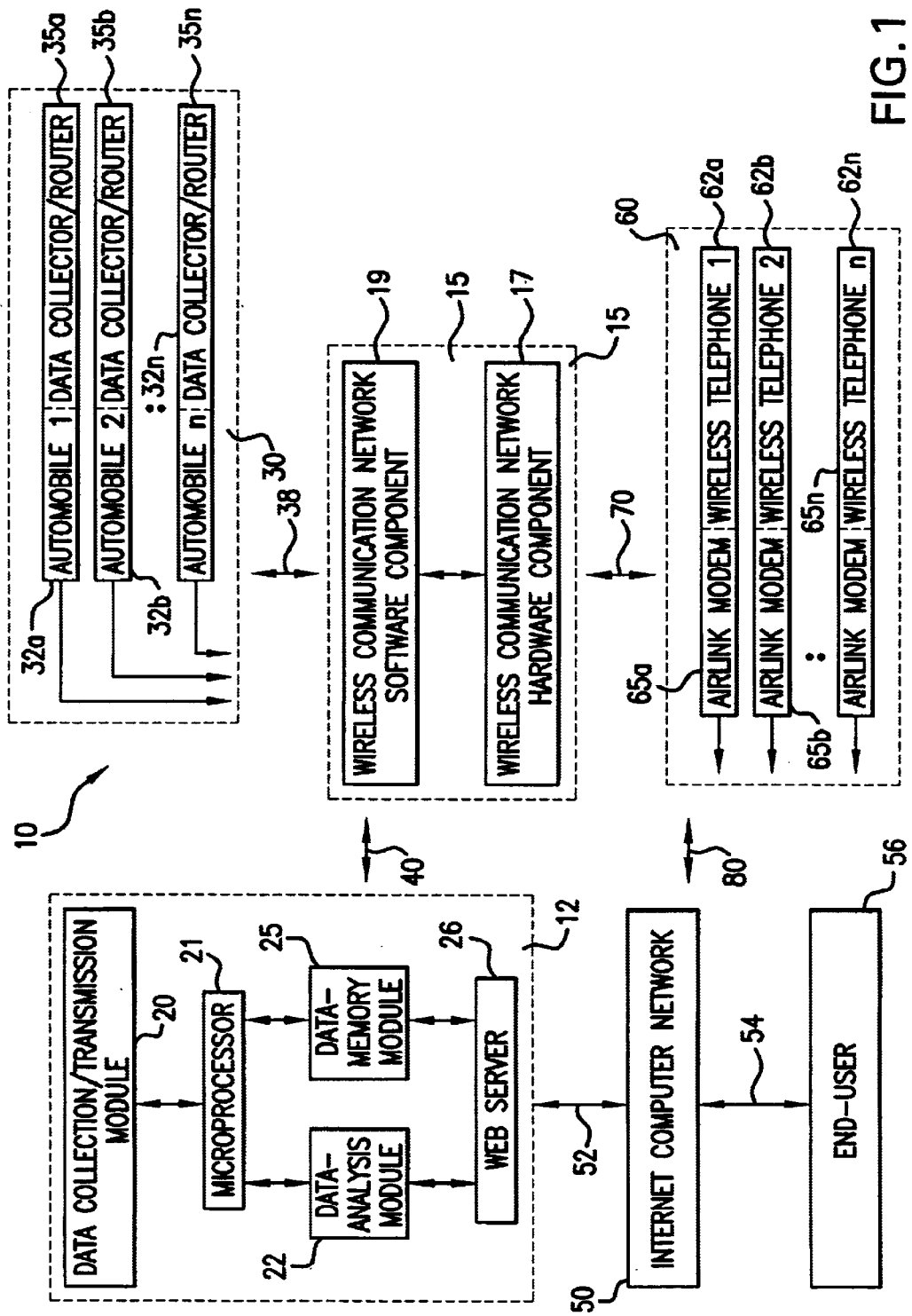
FIG. 1 is a schematic drawing of a wireless diagnostic system in wireless contact with a system of vehicles and the Internet.

FIG. 1 shows a wireless diagnostic system 10 that communicates with a collection of vehicles 30 using a host computer system 12 and a standard wireless communications system 15. The diagnostic system 10 remotely characterizes the vehicles' emissions. The wireless communication system 15 is, e.g., a conventional wireless network, e.g. Bell South's Mobitex network. Each vehicle 32a, 32b, 32n in the collection of vehicles 30 features a data collector/router 35a, 35b, 35n that queries emissions data generated by each vehicle's ECU and OBD-II systems through an OBD buss. After the query, each data collector/router 35a, 35b, 35n receives emissions data from the host vehicle 32a, 32b, 32n and sends it as a data packet over a wireless airlink 38 to the wireless communication system 15. The wireless communication system 15 features a standard hardware component 19 (e.g. a system of base stations, computers, and switching and routing hardware) and software component 17 (e.g., software for controlling the above-mentioned hardware) that relay the data packet through a network connection (e.g., a digital line) 40 to the host computer system 12.

A data collection/transmission module 20 (e.g., a high-speed modem) in the host computer system 12 receives the data packet, which is then processed by a microprocessor 21. The microprocessor controls a data-analysis module 22 (e.g., hardware and software for statistical analysis) that analyzes the data packet to characterize the emissions of each vehicle. The host computer system 12 also includes a data-memory module 25 (e.g., a computer memory or database) that stores the data. A web server 26 receives the processed emissions data from the data-analysis 22 and data-memory modules 25 and makes, it available to an Internet computer network 50 through a first network connection 52. An end-user 56 accesses the data on the web server 26 through a second network connection 54 using the Internet computer network 50.

Data packets from each data collector/router 35a, 35b, 35n can also be accessed directly over an airlink 70 by wireless telephones 62a, 62b, 62n in a wireless telephone network 60. In this case, each wireless telephone 62a, 62b, 62n has an airlink modem 65a, 65b, 65n that allows the data packet to be accessed directly. Alternatively, using the airlink modem 65a, 65b, 65n, the wireless telephones 62a, 62b, 62n can access processed data from the web server 26, provided they have the appropriate software (e.g., web-browsing capabilities). In this case, the web server 26 formats the data in a manner suitable to wireless browsing (e.g. wireless access protocol).

The host computer system 12 typically works bi-directionally, i.e. it can receive emissions data from the data collector/routers 35a, 35b, 35n present on each vehicle 32a, 32b, 32n, and send data to each vehicle using a similar methodology.

Data is typically sent from the host vehicle 32a, 32b, 32n to each data collector/router 35a, 35b, 35n at a predetermined time interval (e.g. a random or periodic time interval, such as every week or every 200 miles) that is programmed in either the data collector/router or the actual vehicle. Alternatively, data can be queried in response to a signal sent from the host computer system 12 to the data collector/routers 35a, 35b, 35n present on each vehicle 32a, 32b, 32n.

FIG. 2 shows a typical data set 90 characterizing a vehicle's emissions sent from a vehicle's data collector/router to the host computer. The data set 90 includes a section 92 that describes each datum, a section 94 that lists the datum's numerical value, and a section 96 that lists the address of the datum's location in the vehicle's ECM (described in this case by a 'PID' code). The data in the set indicate properties relating to the vehicle's engine load, air-flow/intake behavior, and oxygen gas content of the vehicle's actual emission to the environment. The exact format, property description, and addresses used in the data set 90 may vary slightly from vehicle to vehicle; the data set show in FIG. 2 was measured from a Chevrolet Surburban.

Table 1, below, describes how data in the data set 90 relates to engine load, air-flow/intake behavior, and oxygen gas content:

TABLE 1 description of datum in Emissions Data Set

| Description | General Property |
| --- | --- |
| Fuel system status | Engine load |
| Calculated load value | Engine load |
| Engine coolant temp | Engine load |
| Short term fuel trim bank 1 | Engine load |
| Fuel pressure gauge | Engine load |
| Intake manifold pressure | Air-flow/intake behavior |
| Engine speed | Engine load |
| Vehicle speed | Engine load |
| Ignition timing | Engine load |
| Intake air temp | Air-flow/intake behavior |
| Air flow rate | Air-flow/intake behavior |
| Commanded sec. air status | Air-flow/intake behavior |
| O2 sensor location | oxygen gas content |
| O2 data bank 1 sensor 1 | oxygen gas content |
| O2 data bank 2 sensor 4 | oxygen gas content |

Figure 3:
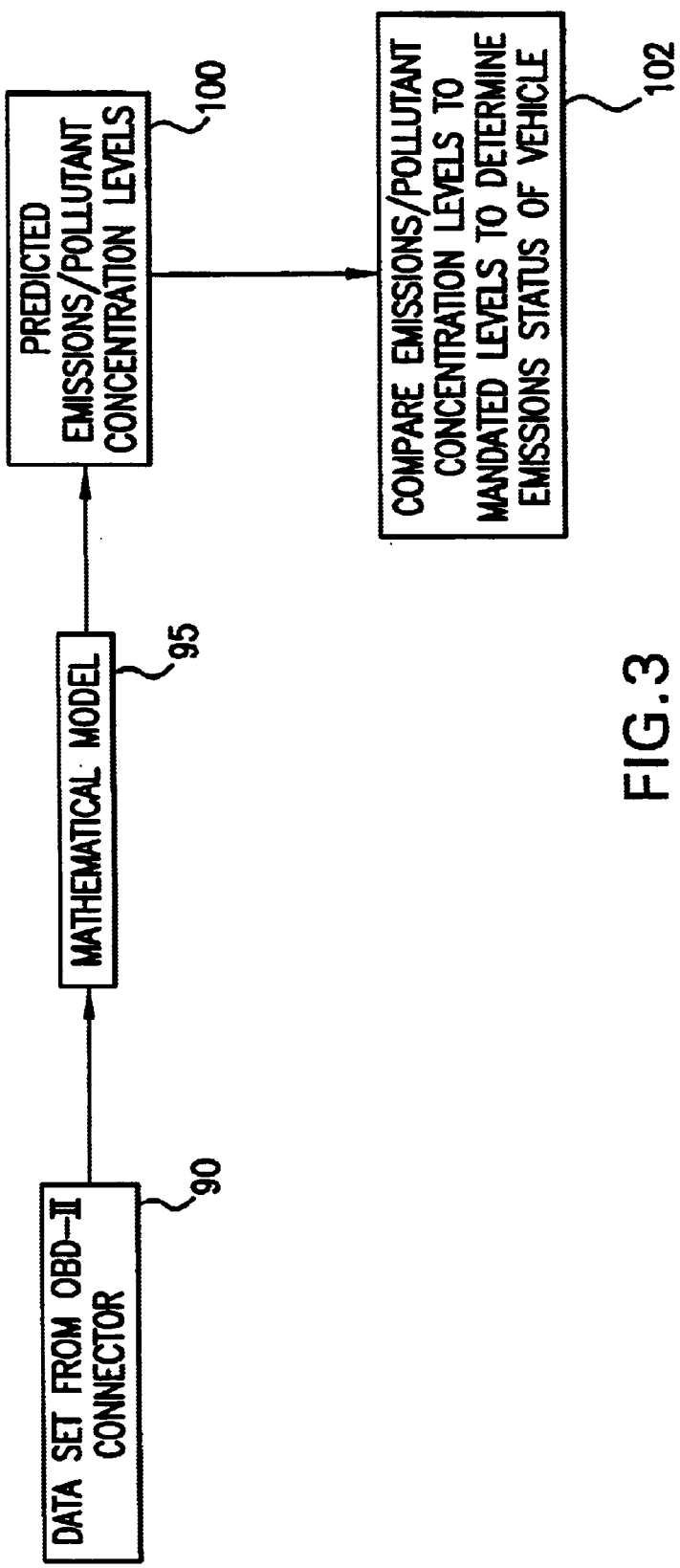
FIG. 3 is a schematic diagram describing how the emissions data file of FIG. 2 is processed to determine emissions data from a vehicle once the data is received by a host computer system of FIG. 1.

FIG. 3 shows how, once collected and stored on the host computer system of FIG. 1, the data set 90 can be analyzed to determine the vehicle's emission performance. A microprocessor in the host computer system performs the analysis, which involves passing the numerical values and descriptions from the data set into a mathematical model 95. The model processes them to predict emissions/pollutant concentration levels 100 for a particular vehicle. A particular model involves the following steps:

STEP 1—measuring a peak-to-peak variation in voltage from the vehicle's heated oxygen sensors distributed before (sensor 1) and after (sensor 2) the catalytic converter.

STEP 2—comparing the peak-to-peak variation in voltage in each sensor from step 1) to a 'transfer function' (i.e., a curve relating the sensor's voltage to an air-fuel ratio, or (air/fuel)$_{actual}$/(air/fuel)$_{stoichiometric}$) to determine an effective range in air/fuel ratio ($\Delta\lambda$) for sensor 1 ($\Delta\lambda_1$) and sensor 2 ($\Delta\lambda_2$).

STEP 3—calculating an oxygen storage capacity (OSC) from the air-fuel ratio from step 2) using the equation: $OSC = (1 - \Delta\lambda_2/\Delta\lambda_1) * (\Delta\lambda_1/C)$, where $C = 33,200/(LOAD*RPM)$ and LOAD and RPM are vehicle data queried from the vehicle's ECM through the OBD-II interface.

STEP 4—comparing the OSC value from 3) to a transfer function that relates this parameter to a hydrocarbon conversion efficiency transfer function to determine the relative deterioration of the vehicle's emissions performance.

Hydrocarbon conversion efficiency decreases with OSC. Thus, at low OSC values the hydrocarbon conversion efficiency is low, meaning that relatively high amounts of hydrocarbons are being released by the vehicle into the environment.

Other methods for calculating or predicting a vehicle's emissions can also be used in place of the above-mentioned algorithm.

Once determined, the predicted emissions/pollutant concentration levels 100 are compared to those mandated by a certifying organization 102 (e.g., the EPA) to determine the status of the vehicle. This last step, for example, is when a vehicle 'passes' or 'fails' a emissions check.

Figure 4:
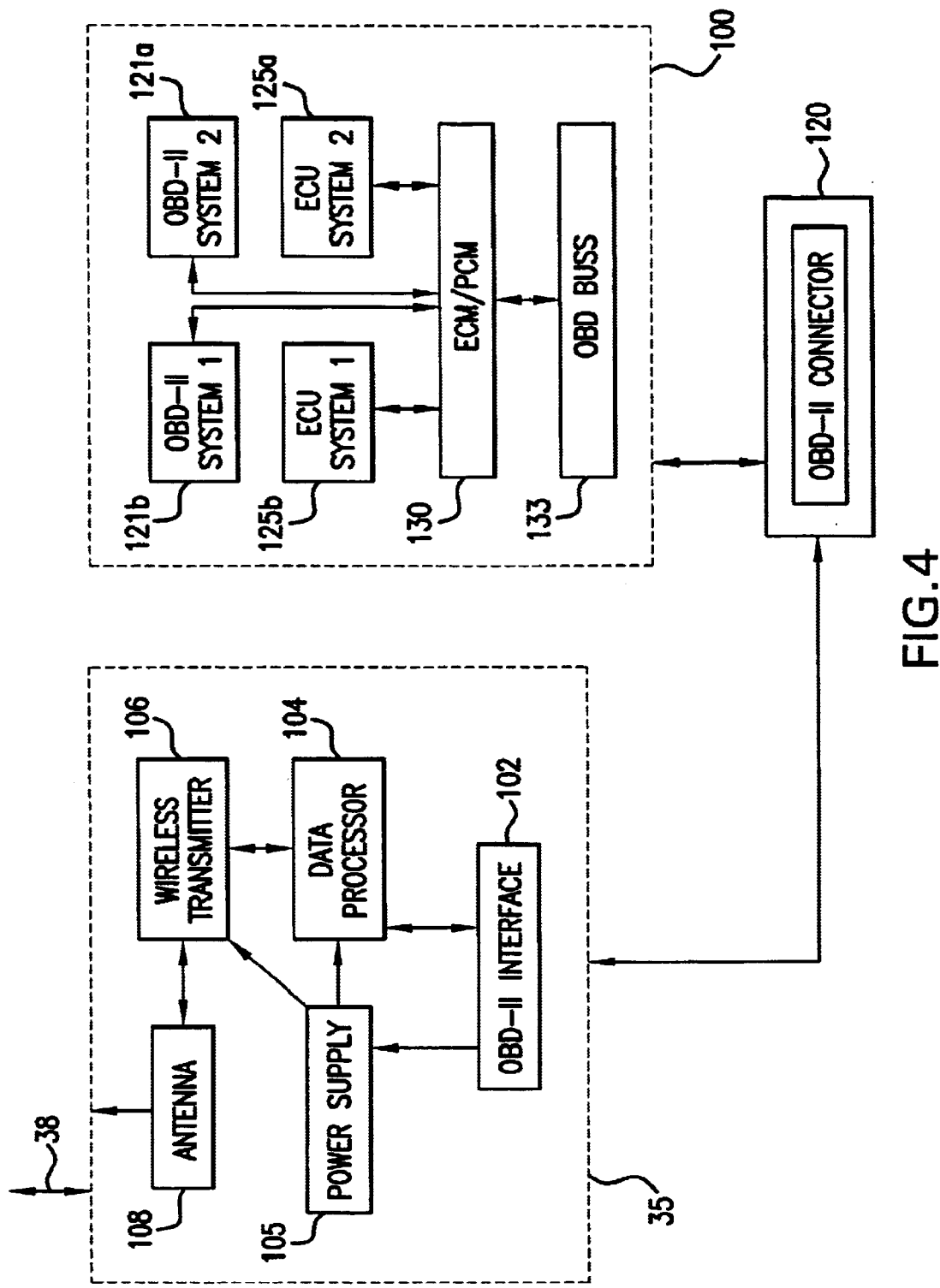
FIG. 4 is a schematic drawing of a data collector/router used in each of the vehicles of FIG. 1.

FIG. 4 shows a data collector/router 35 in electrical contact with a vehicle's OBD/ECU system 100 that sends a data packet containing the emissions data set over a wireless airlink. The data collector/router 35 and OBD/ECU system 100 connect through a conventional OBD-II connector 120 typically located under the vehicle's dashboard. The data collector/router 35 is contained in a small, portable housing that plugs directly into the connector 120 and can be easily installed and replaced.

The connector 120 has a serial, 16-cavity layout, with specific electrical connections in each cavity supplying data and electrical power from the OBD/ECU system 100. The connector electrically and mechanically matches an OBD-II interface 102 in the data collector/router 35. Although the OBD-II connector 120 has a standard mechanical interface, data transmitted through it may have a format and pass through cavities that depend on the vehicle's make and model. For example, Ford and General Motors vehicles use an OBD data format called J1850; data in this format pass through cavities 2 and 10. Chrysler and most European and Asian manufacturers use a data format called ISO 9141-2 and pass data through cavities 7 and 15. In a third format, called J2284, data is passed through cavities 6 and 14.

The connector 120 also passes battery power (cavity 16), automobile chassis ground (cavity 4), and signal ground (cavity 5) from the OBD/ECU system 100 through the OBD-II interface 102 to the data collector/router 35. Using these connections, a power supply 105 receives the battery power, regulates it, and in turn drives a data processor 104 and wireless transmitter 106 within the data collector/router 35.

Once received, data is passed to the data processor 104 (e.g., a microprocessor) that processes and formats it to form a data packet. As an example, a data packet specifically formatted for Bell South's wireless 900 MHz Mobitex MPAK system is described in Table 2, below. Actual data describing the host vehicle is contained in the 516-byte data area described in the table.

TABLE 2 description of Mobitex MPAK data packet

| Bytes | General Description |
| --- | --- |
| 3 | source MAN (unique 24-Bit modem number) |
| 3 | destination MAN (unique 24-Bit modem number) |
| 1 | when sending: Bit 0 = use mailbox |
| | Bit 1 = return positive acknowledgment |
| | Bit 2 = use address list |
| | Bits 3–7 = 0 |
| | when receiving: Bit 4 = may be ignored |
| | Bits 5–7 = traffic state |

TABLE 2-continued description of Mobitex MPAK data packet

| Bytes | General Description |
| --- | --- |
| 1 | MPAK type |
| 0 or 22 | address list |
| 0 to 516 | data payload |

Once properly formatted as described in Table 2, the data packet is passed from the data processor 104 to the wireless transmitter 106. The transmitter 106 transmits the data packet through a conventional wireless antenna 108 over an airlink 38 to a wireless communications system (15) shown in FIG. 1. The data processor 104 formats the data packet according to the wireless communications system that transmits it.

The data area described in Table 2 contains data generated by the vehicle's OBD/ECU system 100. As described above, this system 100 functions effectively as an on-board computer network that generates, transmits, and receives data. For simplicity, the system 100 in FIG. 4 contains two OBD-II systems 121a, 121b and two ECU systems 125a, 125b; it is analogous to more complex OBD-II and ECU systems employed in actual vehicles. The OBD-II systems 121a, 121b are microcontrollers that monitor the various vehicle-related properties described above (e.g., engine load and air-flow/intake behavior). The ECU systems 125a, 125b receive and send data to electromechanical actuators and sensors that measure, e.g., oxygen gas content.

The OBD-II systems 121a, 121b and ECU systems 125a, 125b are controlled by the vehicle's ECM/PCM 130. In some cases, the ECM/PCM 130 receives data from these systems and routes it over a shared electronic OBD buss 133. Alternatively, after receiving the data the ECM/PCM 130 converts it to "fail" or DTC codes that are then routed over the shared electronic buss 133. In both cases, the OBD buss serially transmits data to the data collector/router 35 through the electrically connected OBD connector 120.

Figure 5:
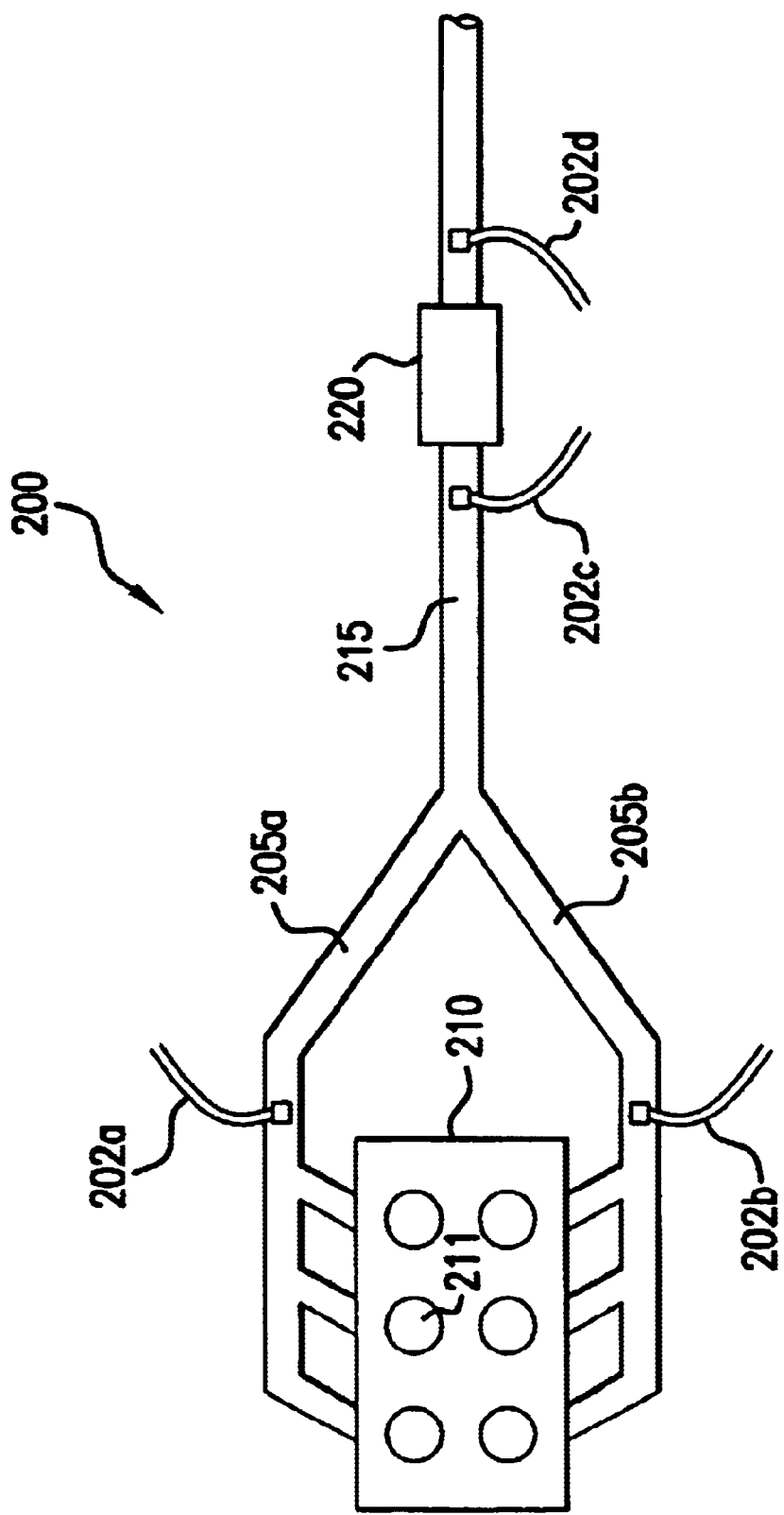
FIG. 5 is a schematic, top view of a vehicle's exhaust manifold that features oxygen sensors and a catalytic converter.

FIG. 5 shows in more detail a vehicle's exhaust manifold 200 that is monitored using the above-mentioned algorithm. The exhaust manifold 200 features oxygen sensors 202a–202d that measure $O_2$ concentration for the emissions data set shown in FIG. 2. These are similar to the oxygen sensors described in the above-mentioned method. The exhaust manifold 200 includes an upper 205a and lower 205b manifold, each of which includes, respectively, an oxygen sensor 202a, 202b. The oxygen sensors 202a, 202b in the upper and lower manifolds 205a, 205b are located proximal to an engine block 210 that includes six cylinders 211. The additional sensors 202c, 202d are located in a lower portion 215 of the exhaust manifold 200. These sensors 202c, 202d are located on each side of a catalytic converter 220.

Each of the oxygen sensors typically includes a 'high' and 'low' signal wire that connects to a comparator in the vehicle's PCM. The 'low' signal wire runs directly to the oxygen sensor to provide the comparator with a reference 'low'. The 'high' signal wire connects directly to a portion of the sensor that is sensitive to the oxygen concentration. During operation of the vehicle, oxygen-containing exhaust flows by the oxygen sensors; in response the comparator generates a voltage that relates to the concentration of $O_2$ gas in the exhaust. The range in this voltage is similar to the range ($\Delta\lambda$) described in the above-mentioned method.

FIGS. 6A–6D show in more detail graphs of actual waveforms generated by the oxygen sensors (202c, 202d)

disposed on each side of the catalytic converter 220 shown in FIG. 5. The catalytic converter 220 contains one or more precious metals (e.g., palladium, platinum, rhodium) that oxidizes unburned hydrocarbons, carbon monoxide (CO), and oxides of nitrogen ($NO_x$) that result from the combustion of gasoline. When the catalyst is working properly, the unburned hydrocarbon and carbon monoxide gases are oxidized to form water vapor ($H_2O$) and carbon dioxide ($CO_2$).

Figure 6A:
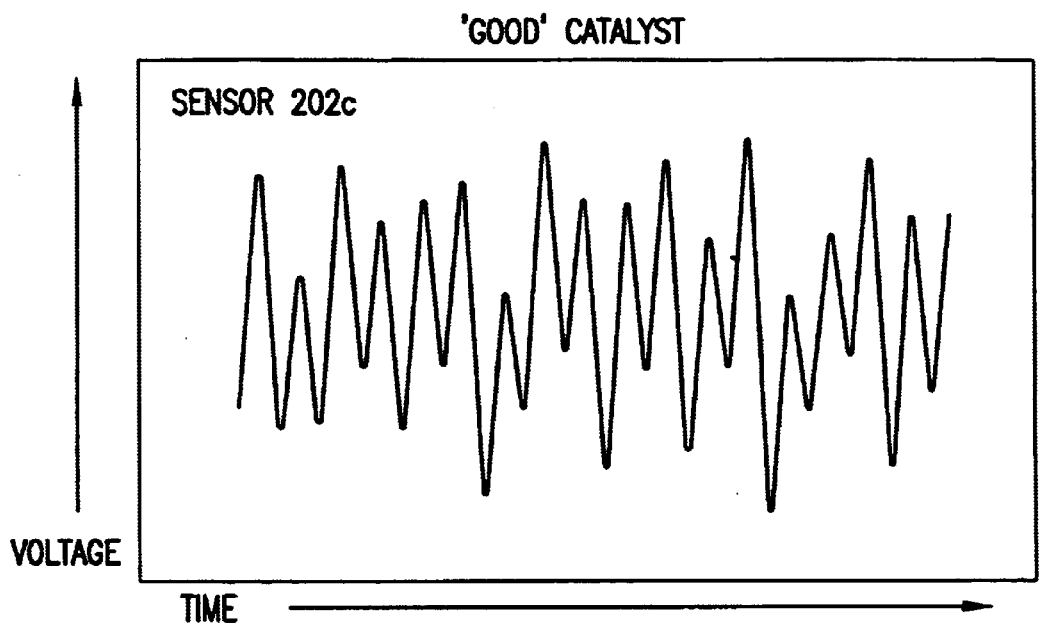
FIGS. 6A and 6B are graphs showing, respectively, the output of the oxygen sensors before and after a 'good' catalytic converter shown in FIG. 5.
Figure 6B:
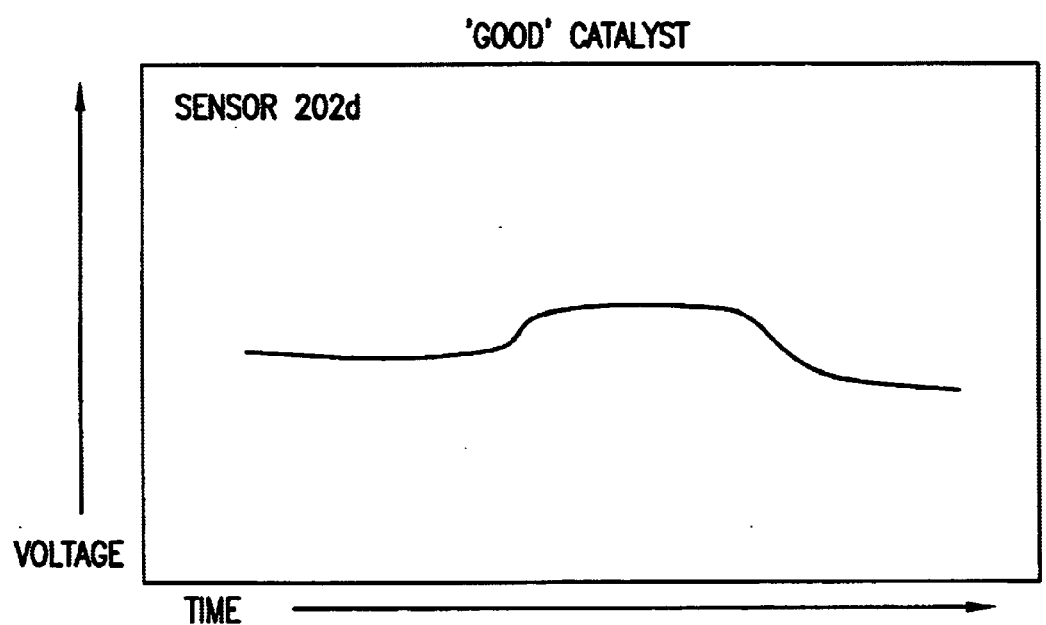
Figure 6C:
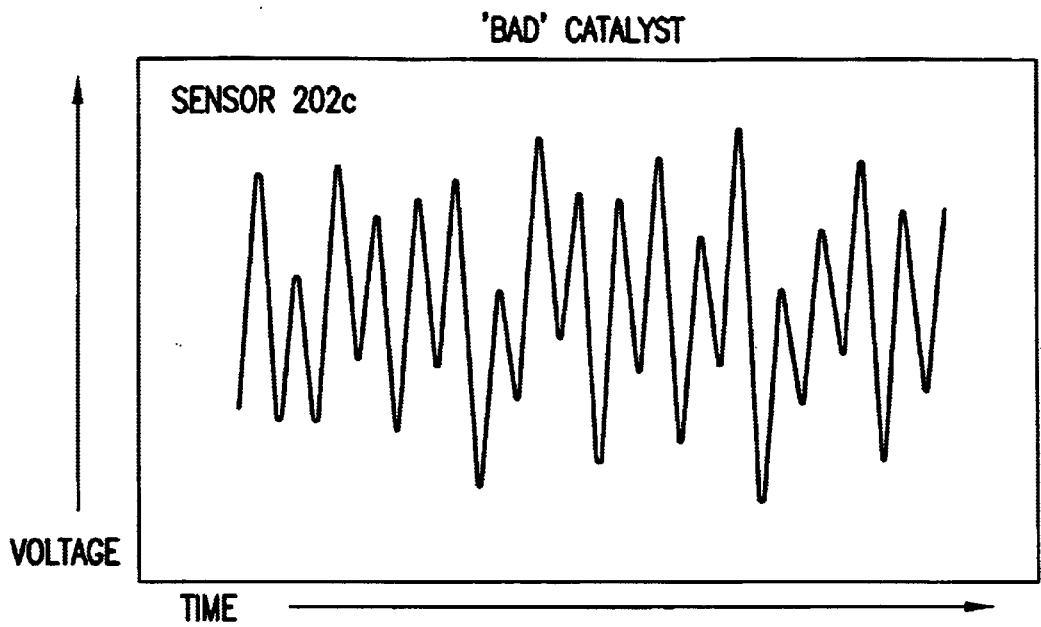
FIGS. 6C and 6D are graphs showing, respectively, the output of the oxygen sensors before and after a 'bad' catalytic converter shown in FIG. 5.

As indicated in FIGS. 6A and 6B, a 'good' catalyst (e.g., one displaying 95% hydrocarbon conversion efficiency) will show a relatively flat time-dependent voltage output (FIG. 6B), indicating that the oxygen gas flowing over the sensor has reached a relatively steady state. This is true even when the oxygen concentration measured before the catalytic converter is fluctuating with time, as indicated by FIG. 6A. This indicates a high oxygen storage capability in the catalyst. Referring to the method described above, in this case $\Delta\lambda_2$ is much less than $\Delta\lambda_1$, and the OSC and hydrocarbon conversion efficiency are both relatively high.

Figure 6D:
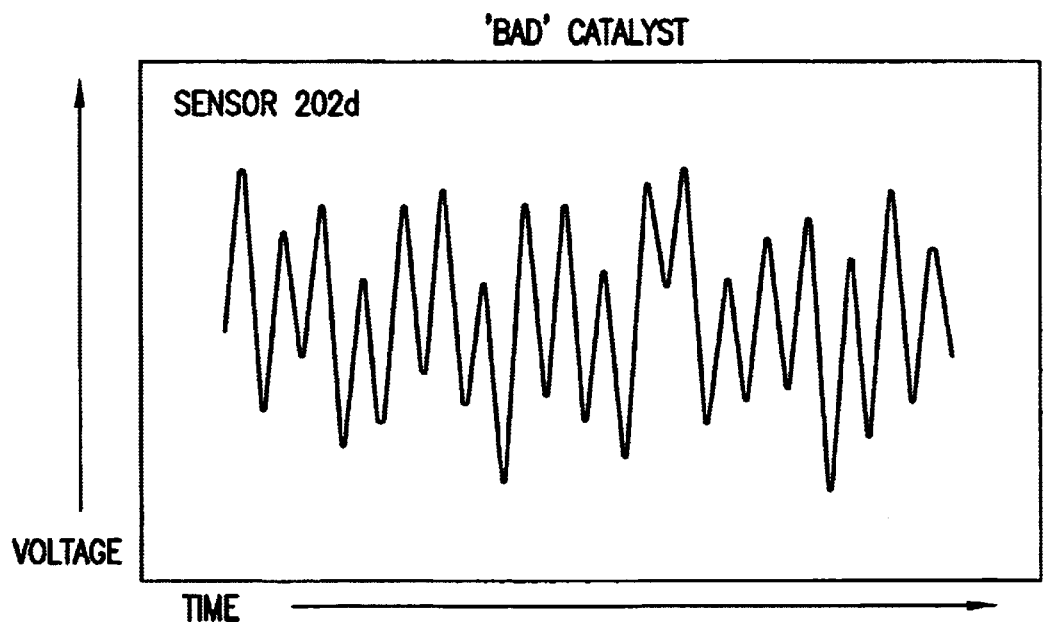

In contrast, under the same conditions, a 'poor' catalyst results in peaks and valleys in the output of the oxygen sensor after the catalytic converter, as indicated by FIG. 6D. This indicates that the catalyst has a low oxygen storage capability, i.e. it has lost some of its ability to process the exhaust gasses properly. A catalyst that indicates a reduced efficiency based on the graph shown in FIG. 6D is likely to be inefficient in converting hydrocarbons as well as CO and $NO_x$. According to the above-described method, in this case $\alpha\lambda_2$ is similar in magnitude to $\Delta\lambda_1$, and the OSC and hydrocarbon conversion efficiency are both relatively low.

Figure 7:
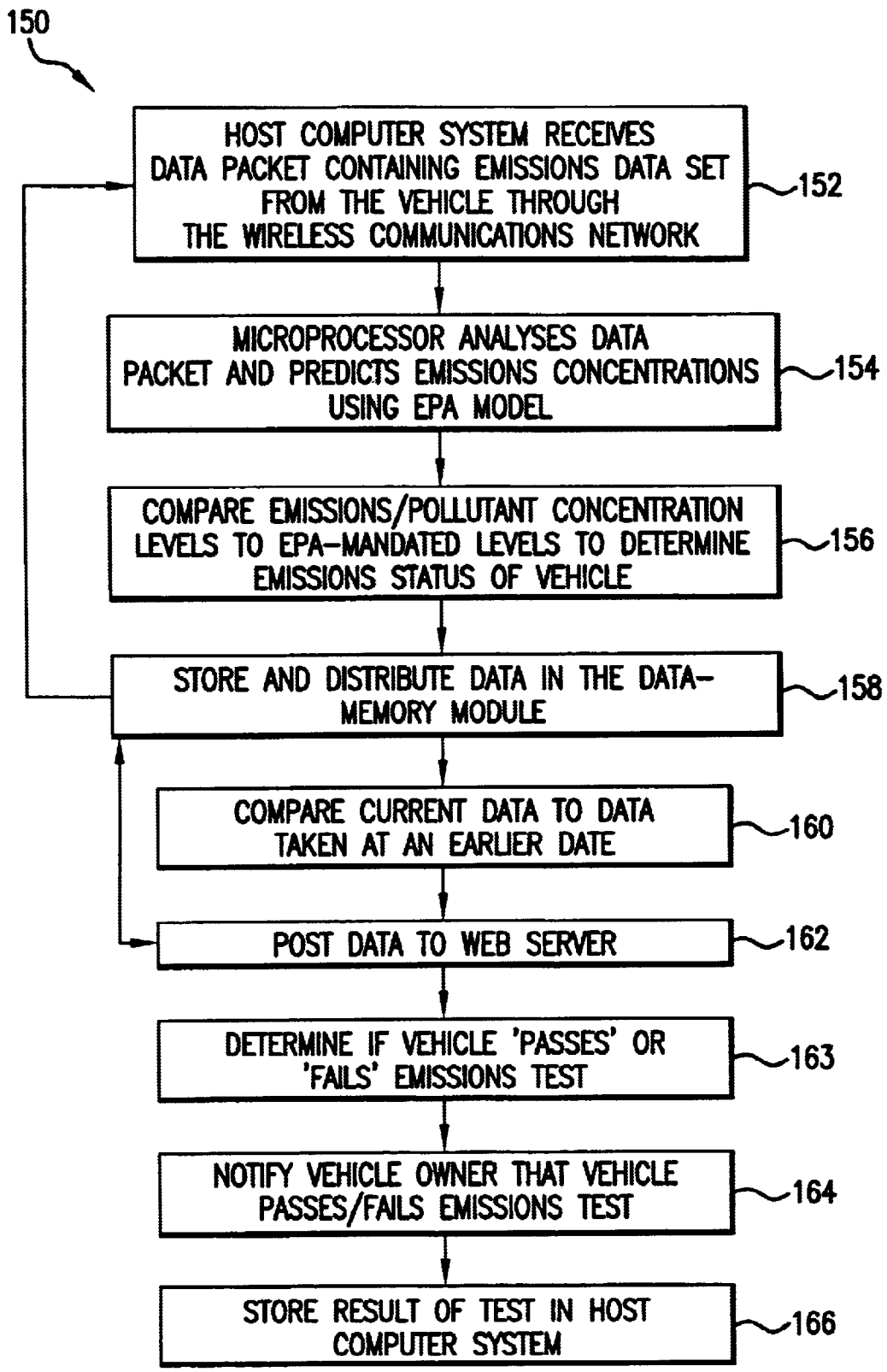
FIG. 7 is a flow chart describing analysis of data transmitted by the data collector/router by the host computer of FIG. 1.

Once the emissions data set is collected and analyzed as described above, the host computer remotely characterizes emissions from a large set of vehicles without requiring the vehicles to be brought into a service center. This allows, for example, 'on-line emissions checks' and related services to be performed. FIG. 7 shows a flow chart describing one method 150 of how data is analyzed in this manner and then made available to end-users through the Internet. A wide number of related data-analysis methods are possible; the one shown in FIG. 7 was chosen because of its simplicity.

In the data-analysis method 150, the host computer system receives a data packet containing the emissions data set from the vehicle through the wireless communications network (step 152). The data set and data packets have formats shown, respectively, in Tables 1–2, above. Once received, the packet is analyzed and the host computer predicts emissions/pollutants concentrations (step 154 and step 100 in FIG. 3) using the above-described model. The host computer then compares the emissions/pollutant concentration levels to predetermined mandated levels to determine the emissions status of a particular vehicle (step 156 and step 102 in FIG. 3). At this point the results from steps 154 and 156 are distributed and stored in the data-memory module (e.g. a database) of the host computer system (step 158). Some data may be simply disregarded during this step. This portion (steps 152, 154, 156, and 158) of the method 150 may be repeated at this point to generate additional data.

The emissions data can be posted directly on a Web page on the Web server (step 162) where it is accessible by the end-user through the Internet. For example, at this point the emissions data is posted to a Web server at an emissions-monitoring organization, e.g. the EPA. At this point the data may be stored (step 158) and then compared to emissions data collected at an earlier time (step 160) to determine the emissions 'trends' of a particular vehicle. A computer connected to the Web server then determines if the vehicle 'passes' or 'fails' an emissions 'test' that relies on predetermined criteria for acceptable emissions (step 163). The host computer system then notifies the user through electronic mail of the test results (step 164). The results of the test may also be stored in the host computer system (step 166) so that they can be accessed at a later time.

Other embodiments are within the scope of the invention. For example, depending on the make and model of the vehicle, the data packet can contain hundreds of additional datum that describe, e.g.: i) basic properties of the power train (e.g., emission levels, fuel-system status, engine temperature, speed and odometer readings, anti-lock brake status, RPMs, fuel and intake manifold pressure); and ii) manufacturer-specific information (e.g., status of the door locks, airbags, and entertainment center). In total, there are typically hundreds of datum that can be included in the data packet. Each of these can be analyzed in a manner similar to that described above to determine a variety of properties of the vehicle.

In addition, data packets routed through the wireless communications system 15 can be analyzed to determine the vehicle's approximate location. This can be done with relatively low accuracy (within a few miles) by simply recording the location of a specific base station in the hardware component 17 of the wireless communications system 15 that routes the data packet to the host computer system 12. The accuracy of the vehicle's location is increased by recording the location of multiple base stations within range of the vehicle, and then analyzing these data using conventional triangulation algorithms. The data collector/router can also be modified to include hardware for global positioning (GPS). Using a satellite infrastructure, GPS hardware transmits real-time longitude and latitude values that can be analyzed to accurately determine a vehicle's location.

The components used in the data collector/router (particularly the wireless transmitter) may also be optimized for different types of wireless communications systems. These systems include wireless telephone and paging systems, Bluetooth®, and similar systems. Similarly, the format of the data packet may also be adjusted for transmission over different types of networks. In general, any components in the data collector/router, and any format of the data packet, can be used to accomplish the general method of the invention.

Likewise, a wide range of additional mathematical algorithms can be used to analyze data once it is extracted from the data packets. These algorithms range from the relatively simple (e.g., simple comparative algorithms) to the complex (e.g., predictive engine diagnoses using 'data mining' techniques). Data analysis may be used to characterize an individual vehicle as described above, or a collection of vehicles. Algorithms used to characterize a collection of vehicles can be used, for example, for remote vehicle or parts surveys, to characterize emission performance in specific geographic locations, or to characterize traffic.

Other embodiments of the invention include algorithms for analyzing data to characterize vehicle accidents and driving patterns for insurance purposes; algorithms for determining driving patterns for use-based leasing; algorithms for analyzing data for insurance purposes; and algorithms for recording vehicle use and driving patterns for tax purposes. In general, any algorithm that processes data collected with the above-described method is within the scope of the invention.

Similarly, the temporal or mileage frequency at which data is collected can be adjusted to diagnose specific types of problems. For example, characterization of certain types of vehicle performance indicators, such as emissions, may need to be monitored relatively frequently. Other properties, such as mileage and fluid levels, may only need to be monitored every few days, or in some cases just a few times each year.

Once the data are analyzed, the Web page used to display the data can take many different forms. Different Web pages may be designed and accessed depending on the end-user. For example, individual users may have access to Web pages for their particular vehicle. Conversely, vehicle service providers (e.g. providers that change oil or certify a vehicle's emissions) may have access to Web pages that contain data (e.g., mileage and emissions data) from a wide range of vehicles. These data, for example, can be sorted and analyzed depending on vehicle make, model, and geographic location. Web pages may also be formatted using standard wireless access protocols (WAP) so that they can be accessed using wireless devices such as cellular telephones, personal digital assistants (PDAs), and related devices.

In other embodiments, data from the data collector/router in the vehicle can be analyzed and used for: remote billing/payment of tolls; remote emissions checks; remote payment of parking/valet services; remote control of the vehicle (e.g., in response to theft or traffic/registration violations); and general survey information.

Still other embodiments are within the scope of the following claims.

What is claimed is:

1. A method for characterizing a vehicle's emissions, comprising the steps of:
    wirelessly receiving data from a wireless network, the data representative of the vehicle's emissions as measured by at least one sensor disposed within the vehicle; and
    analyzing the data with a computer to characterize the vehicle's emissions.

2. The method of claim 1, wherein analyzing the data further comprises comparing the data or a parameter generated by analyzing the data to at least one predetermined value to characterize the vehicle's emissions.

3. The method of claim 1, wherein the emissions are gas emissions.

4. The method of claim 3, wherein the gas emissions contain at least one of oxygen, oxides of nitrogen, and hydrocarbons.

5. The method of claim 1, wherein the data are representative of emissions from the vehicle's exhaust manifold or tailpipe.

6. The method of claim 1, further comprising analyzing the data with the computer to characterize the vehicle's emissions performance.

7. The method of claim 6, further comprising displaying results from the analysis on a computer, cellular telephone, or wireless device connected to the World Wide Web or the Internet.

8. The method of claim 6, further comprising displaying the results from the analysis on a web page on the World Wide Web or the Internet.

9. The method of claim 8, wherein the displayed results from the analysis constitute the results of an emissions test defined by a regulatory body or government agency.

10. The method of claim 6, wherein analyzing the data is done continuously in real time;
    wherein receiving data is done continuously in real time; and
    wherein the data is representative of the vehicle's emissions measured continuously in real time.

11. The method of claim 10, further comprising displaying the results of the analyzing, on a computer, cellular telephone, wireless device connected to the World Wide Web or the Internet, or on a web page on the World Wide Web on the Internet, when the vehicle fails emissions standards.

12. The method of claim 11, wherein the emissions standards are defined by a regulatory body or government agency.

13. The method of claim 1, further comprising extracting data from the received data and storing the extracted data in a computer memory or database communicating with the computer.

14. The method of claim 13, further comprising processing the data stored in the computer memory or database with an algorithm.

15. The method of claim 13, further comprising analyzing the stored data with a mathematical algorithm to predict, infer, or estimate the emissions from the vehicle.

16. The method of claim 13, further comprising analyzing the stored data with a mathematical algorithm to predict or estimate the concentration or amount of at least one of oxygen, oxides of nitrogen, hydrocarbons, or derivatives thereof in the vehicle's emissions.

17. The method of claim 1, further comprising comparing the received data with data collected at an earlier time to characterize the vehicle's emissions.

18. The method of claim 1, further comprising comparing the received data with a predetermined numerical value or collection of numerical values to characterize the emissions of the vehicle.

19. The method of claim 1, further comprising sending an electronic text, data, or voice message to a second computer, cellular telephone, or wireless device after the data are analyzed, said message containing information about the analyzed data.

20. The method of claim 19, wherein the electronic text, data, or voice message describes a status of the vehicle's emissions.

21. The method of claim 1, further comprising wirelessly sending a second set of data from the computer.

22. The method of claim 1, wherein the vehicle is selected from a group comprising an automobile, truck, wheeled commercial equipment, heavy truck, power sport vehicle, collision repair vehicle, marine vehicle, and recreational vehicle.

23. The method of claim 1, wherein the vehicle is remote from any vehicle service center and any vehicle emissions test center.

24. A method for characterizing a vehicle's emissions, comprising the steps of:
    wirelessly receiving data from a wireless network, the data representative of the vehicle's emissions as measured by at least one sensor disposed within the vehicle;
    analyzing the data with a computer to characterize the vehicle's emissions;
    displaying the results from the analysis on a web page on the World Wide Web or the Internet;
    wherein the vehicle is remote from any vehicle service center and any vehicle emissions test center; and
    wherein the displayed results from the analysis constitute the results of an emissions test defined by a regulatory body or government agency.

25. A method for characterizing a vehicle's emissions, comprising the steps of:
- generating data representative of the vehicle's emissions with at least one sensor disposed within the vehicle;
- transferring the data to a data collector/router disposed within the vehicle and comprising a wireless transmitter configured to transmit data over a wireless communications network; and
- wirelessly transmitting, with the wireless transmitter, to a host computer system, the data representing the vehicle's emissions, the host computer system configured to receive the data representing the vehicle's emissions, and to analyze the received data by comparing the data, or one or more parameters generated by processing the data, with at least one predetermined parameter.

26. The method of claim 25, wherein the data is serially transferred through an OBD-II connector or a similar serial interface to the data collector/router.

27. The method of claim 25, wherein the generating step further comprises generating data using a gas-sensitive sensor.

28. The method of claim 27, wherein the sensor generates a signal in response to gas containing at least one of oxygen, oxides of nitrogen, and hydrocarbons.

29. The method of claim 28, wherein the sensor is disposed in the vehicle's exhaust manifold or tailpipe.

30. The method of claim 25, further comprising processing data in the data collector/router to generate a signal, and sending the signal to at least one microcontroller disposed within the vehicle.

31. The method of claim 30, wherein the signal is processed by the host computer system and used to adjust a property of the the sensor.

32. The method of claim 30, wherein the signal is processed by the microcontroller and used to affect a status of a diagnostic trouble code stored in a memory on the vehicle.

33. The method of claim 25, wherein the vehicle is selected from a group comprising an automobile, truck, wheeled commercial equipment, heavy truck, power sport vehicle, collision repair vehicle, marine vehicle, and recreational vehicle.

34. A programmed apparatus, programmed to execute a method comprising the steps of:
- wirelessly receiving data from a wireless network, the data representative of a vehicle's emissions as measured by at least one sensor disposed within the vehicle; and
- analyzing the data with a computer to characterize the vehicle's emissions.

35. The apparatus of claim 34, wherein analyzing the data further comprises comparing the data to at least one predetermined value to characterize the vehicle's emissions.

36. The apparatus of claim 34, wherein the emissions are gas emissions.

37. The apparatus of claim 36, wherein the gas emissions contain at least one of oxygen, oxides of nitrogen, and hydrocarbons.

38. The apparatus of claim 34, wherein the data is representative of emissions from the vehicle's exhaust manifold or tailpipe.

39. The apparatus of claim 34, further comprising displaying results from the analysis on a computer, cellular telephone, or wireless device connected to the World Wide Web or the Internet.

40. The apparatus of claim 34, further comprising displaying the results from the analysis on a web page on the World Wide Web or the Internet.

41. The apparatus of claim 40, wherein the vehicle is remote from any vehicle service center and any vehicle emissions test center; and
- wherein the displayed results from the analysis constitute the results of an emissions test defined by a regulatory body or government agency.

42. The apparatus of claim 34, wherein analyzing the data is done continuously in real time;
- wherein receiving data is done continuously in real time; and
- wherein the data is representative of the vehicle's emissions measured continuously in real time.

43. The apparatus of claim 42, further comprising displaying the results of the analyzing, on a computer, cellular telephone, wireless device connected to the World Wide Web or the Internet, or on a web page on the World Wide Web on the Internet, when the vehicle fails emissions standards.

44. The apparatus of claim 43, wherein the emissions standards are defined by a regulatory body or government agency.

45. The apparatus of claim 34, further comprising analyzing the data with the computer to characterize the vehicle's emissions performance.

46. The apparatus of claim 34, further comprising extracting data from the received data and storing the extracted data in a computer memory or database communicating with the computer.

47. The apparatus of claim 46, further comprising processing the data stored in the computer memory or database with an algorithm.

48. The apparatus of claim 46, further comprising analyzing the stored data with a mathematical algorithm to predict, infer, or estimate the emissions from the vehicle.

49. The apparatus of claim 46, further comprising analyzing the stored data with a mathematical algorithm to predict or estimate the concentration or amount of at least one of oxygen, oxides of nitrogen, hydrocarbons, or derivatives thereof in the vehicle's emissions.

50. The apparatus of claim 34, further comprising comparing the received data with data collected at an earlier time to characterize the vehicle's emissions.

51. The apparatus of claim 34, further comprising comparing the received data with a predetermined numerical value or collection of numerical values to characterize the emissions of the vehicle.

52. The apparatus of claim 34, further comprising sending an electronic text, data, or voice message to a second computer, cellular telephone, or wireless device after the data is analyzed, said message containing information about the analyzed data.

53. The apparatus of claim 52, wherein the electronic text, data, or voice message describes a status of the vehicle's emissions.

54. The apparatus of claim 34, further comprising wirelessly sending a second set of data from the computer.

55. The apparatus of claim 34, wherein the vehicle is selected from a group comprising an automobile, truck, wheeled commercial equipment, heavy truck, power sport vehicle, collision repair vehicle, marine vehicle, and recreational vehicle.

56. A programmed apparatus, programmed to execute a method comprising the steps of:
- wirelessly receiving data from a wireless network, the data representative of a vehicle's emissions as measured by at least one sensor disposed within the vehicle;
- analyzing the data with a computer to characterize the vehicle's emissions;

displaying the results from the analysis on a web page on the World Wide Web or the Internet;

wherein the vehicle is remote from any vehicle service center and any vehicle emissions test center; and wherein the displayed results from the analysis constitute the results of an emissions test defined by a regulatory body or government agency.

57. A programmed apparatus, programmed to execute a method comprising the steps of:

generating data representative of a vehicle's emissions with at least one sensor disposed within the vehicle;

transferring the data to a data collector/router disposed within the vehicle and comprising a wireless transmitter configured to transmit data over a wireless communications network;

wirelessly transmitting the data representing the vehicle's emissions with the wireless transmitter to a host computer system configured to analyze the data to determine the vehicle's emissions status; and wirelessly receiving, from the host computer system, information describing the vehicle's emissions status.

58. The apparatus of claim 57, wherein the data are serially transferred through an OBD-II connector or a similar serial interface to the data collector/router.

59. The apparatus of claim 57, wherein the generating step further comprises generating data using a gas-sensitive sensor.

60. The apparatus of claim 59, wherein the sensor generates a signal in response to gas containing at least one of oxygen, oxides of nitrogen, and hydrocarbons.

61. The apparatus of claim 60, wherein the sensor is disposed in the vehicle's exhaust manifold or tailpipe.

62. The apparatus of claim 57, further comprising processing in the data collector/router to generate a signal, and sending the signal to at least one microcontroller disposed within the vehicle.

63. The apparatus of claim 62, wherein the signal is processed by the microcontroller and used to adjust a property of the microcontroller.

64. The apparatus of claim 62, wherein the signal is processed by the microcontroller and used to affect a status of a diagnostic trouble code stored in a memory on the vehicle.

65. The apparatus of claim 57, wherein the vehicle is selected from a group comprising an automobile, truck, wheeled commercial equipment, heavy truck, power sport vehicle, collision repair vehicle, marine vehicle, and recreational vehicle.

66. A machine-readable memory medium, containing program code, which when executed by a programmable apparatus, causes that apparatus to execute a method comprising the steps of:

wirelessly receiving data from a wireless network, the data representative of a vehicle's emissions as measured by at least one sensor disposed within the vehicle; and analyzing the data with a computer to characterize the vehicle's emissions.

67. The machine-readable medium of claim 66, wherein analyzing the data further comprises comparing the data to at least one predetermined value to characterize the vehicle's emissions.

68. The machine-readable medium of claim 66, wherein the emissions are gas emissions.

69. The machine-readable medium of claim 68, wherein the gas emissions contain at least one of oxygen, oxides of nitrogen, and hydrocarbons.

70. The machine-readable medium of claim 66, wherein the data is representative of emissions from the vehicle's exhaust manifold or tailpipe.

71. The machine-readable medium of claim 66, further comprising analyzing the data with the computer to characterize the vehicle's emissions performance.

72. The machine-readable medium of claim 71, further comprising displaying results from the analysis on a computer, cellular telephone, or wireless device connected to the World Wide Web or the Internet.

73. The machine-readable medium of claim 71, further comprising displaying the results from the analysis on a web page on the World Wide Web or the Internet.

74. The machine-readable medium of claim 73, wherein the vehicle is remote from any vehicle service center and any vehicle emissions test center; and wherein the displayed results from the analysis constitute the results of an emissions test defined by a regulatory body or government agency.

75. The machine-readable medium of claim 71 wherein analyzing the data is done continuously in real time;

wherein receiving data is done continuously in real time; and wherein the data is representative of the vehicle's emissions measured continuously in real time.

76. The machine-readable medium of claim 75, further comprising displaying the results of the analyzing, on a computer, cellular telephone, wireless device connected to the World Wide Web or the Internet, or on a web page on the World Wide Web on the Internet, when the vehicle fails emissions standards.

77. The machine-readable medium of claim 76, wherein the emissions standards are defined by a regulatory body or government agency.

78. The machine-readable medium of claim 66, further comprising extracting data from the received data and storing the extracted data in a computer memory or database communicating with the computer.

79. The machine-readable medium of claim 78, further comprising processing the data stored in the computer memory or database with an algorithm.

80. The machine-readable medium of claim 78, further comprising analyzing the stored data with a mathematical algorithm to predict, infer, or estimate the emissions from the vehicle.

81. The machine-readable medium of claim 78, further comprising analyzing the stored data with a mathematical algorithm to predict or estimate the concentration or amount of at least one of oxygen, oxides of nitrogen, hydrocarbons, or derivatives thereof in the vehicle's emissions.

82. The machine-readable medium of claim 66, further comprising comparing the received data with data collected at an earlier time to characterize the vehicle's emissions.

83. The machine-readable medium of claim 66, further comprising comparing the received data with a predetermined numerical value or collection of numerical values to characterize the emissions of the vehicle.

84. The machine-readable medium of claim 66, further comprising sending an electronic text, data, or voice message to a second computer, cellular telephone, or wireless device after the data is analyzed, said message containing information about the analyzed data.

85. The machine-readable medium of claim 84, wherein the electronic text, data, or voice message describes a status of the vehicle's emissions.

86. The machine-readable medium of claim 66, further comprising wirelessly sending a second set of data from the computer.

87. The machine-readable medium of claim 66, wherein the vehicle is selected from a group comprising an automobile, truck, wheeled commercial equipment, heavy truck, power sport vehicle, collision repair vehicle, marine vehicle, and recreational vehicle.

88. A machine-readable memory medium, containing program code, which when executed by a programmable apparatus, causes that apparatus to execute a method comprising the steps of:

wirelessly receiving data from a wireless network, the data representative of a vehicle's emissions as measured by at least one sensor disposed within the vehicle;

analyzing the data with a computer to characterize the vehicle's emissions;

displaying the results from the analysis on a web page on the World Wide Web or the Internet;

wherein the vehicle is remote from any vehicle service center and any vehicle emissions test center; and wherein the displayed results from the analysis constitute the results of an emissions test defined by a regulatory body or government agency.

89. The machine-readable memory medium of claim 88, wherein the vehicle is selected from a group comprising an automobile, truck, wheeled commercial equipment, heavy truck, power sport vehicle, collision repair vehicle, marine vehicle, and recreational vehicle.

\* \* \* \* \*